US007694237B2

(12) United States Patent
Pusa et al.

(10) Patent No.: US 7,694,237 B2
(45) Date of Patent: Apr. 6, 2010

(54) METHOD AND APPARATUS FOR USING MENU FUNCTIONS OF AN ELECTRONIC DEVICE

(75) Inventors: Juha Pusa, Pirkkala (FI); Katja Leinonen, Tampere (FI); Jussi-Pekka Kekki, Tampere (FI)

(73) Assignee: Nokia Corporation, Espoo (FI)

( * ) Notice: Subject to any disclaimer, the term of this patent is extended or adjusted under 35 U.S.C. 154(b) by 848 days.

(21) Appl. No.: 10/427,302

(22) Filed: May 1, 2003

(65) Prior Publication Data

US 2003/0206199 A1 Nov. 6, 2003

(30) Foreign Application Priority Data

May 3, 2002 (FI) .................................. 20020847

(51) Int. Cl.
*G06F 3/00* (2006.01)
*G06F 9/00* (2006.01)
*G06F 17/00* (2006.01)

(52) U.S. Cl. ...................... 715/841; 715/828; 715/829; 715/810; 715/819

(58) Field of Classification Search ................ 715/810, 715/817, 818, 819, 820, 828, 829, 839, 841, 715/763, 790, 825, 830, 834
See application file for complete search history.

(56) References Cited

U.S. PATENT DOCUMENTS

| 5,530,796 | A | * | 6/1996 | Wang | 715/762 |
| 5,699,244 | A | * | 12/1997 | Clark et al. | 702/2 |
| 5,701,424 | A | * | 12/1997 | Atkinson | 715/808 |
| 5,897,670 | A | | 4/1999 | Nielsen | 345/334 |
| 6,002,398 | A | | 12/1999 | Wilson | 345/346 |
| 6,414,700 | B1 | * | 7/2002 | Kurtenbach et al. | 715/810 |
| 6,690,391 | B1 | * | 2/2004 | Proehl et al. | 715/720 |
| 6,823,494 | B2 | * | 11/2004 | Minoura et al. | 715/800 |
| 2001/0002128 | A1 | * | 5/2001 | Takayama et al. | 345/352 |
| 2001/0006388 | A1 | | 7/2001 | Kim et al. | 340/568.1 |
| 2002/0122027 | A1 | * | 9/2002 | Kim | 345/167 |
| 2002/0162108 | A1 | * | 10/2002 | Lin-Hendel | 725/52 |

FOREIGN PATENT DOCUMENTS

| EP | 0 935 191 A2 | 8/1999 |
| EP | 0 944 218 A1 | 9/1999 |
| EP | 1 182 853 A2 | 2/2002 |
| JP | 04051319 A * | 2/1992 |
| JP | 05257627 A * | 10/1993 |
| KR | 2002-15273 A | 2/2002 |
| WO | WO-97/36223 A1 | 10/1997 |
| WO | WO-00/27098 A1 | 5/2000 |
| WO | WO-01/61974 A1 | 8/2001 |

* cited by examiner

*Primary Examiner*—Tadesse Hailu
*Assistant Examiner*—Anita D Chaudhuri
(74) *Attorney, Agent, or Firm*—Harrington & Smith

(57) ABSTRACT

A method and an apparatus for using menu functions of an electronic device are presented. The electronic device provides the menu functions in a menu layer structure that comprises a top menu layer and at least one lower menu layer. One of the lower menu layers is a bottom menu layer. The top menu layer overlaps at least partially the lower menu layers. A user of the electronic device selects a menu layer to be provided as a top menu layer from the lower menu layers by giving a first command and the user selects a function to be performed from the top menu layer by giving a second command.

43 Claims, 7 Drawing Sheets

METHOD AND APPARATUS FOR USING MENU FUNCTIONS OF AN ELECTRONIC DEVICE

The present invention relates to a method and an apparatus for interaction with a user interface and particularly, although not necessarily, for interaction with a user interface of a mobile terminal device.

PRIOR ART

The current user interfaces in mobile devices have several different input mechanisms that are used for interaction. They have evolved from text-based menus towards more graphical user interfaces but the interaction methods have remained pretty much the same. By introduction of small joystick-like input mechanisms the visual user interface has evolved towards icon-based interaction.

Patent application WO 01/61974 discloses a joystick, positioned close to a display of the mobile telephone, which is used to navigate through menus on the display e.g. up and down levels of the menu and up and down lists of functions at the same level and also to select and/or initiate functions. A user can use the joystick whilst continuously watching the screen, thus making navigation easier. Further the user merely has to nudge the joystick in the required direction e.g. "right" to navigate deeper through a menu structure e.g. from the top level to the selected function. This kind of navigation method is disadvantageous for a user, because it usually offers more choices than the user actually requires. Further, the user is able to see only one layer at a time on the display, which makes it difficult to remember where certain actions or objects are located. This leads easily to losing the sight of the whole content of the menu structure.

Patent application WO 00/27098 provides a menu structure, which allows the user to copy selected items into a specific dedicated branch of the structure. This has the advantage that the user will then know that all commonly used features are accessible through that branch. The short menu, containing items selected by the user, is then located at a specific predetermined point in the overall menu structure. Advantageously, the predetermined point is at the highest level in the menu structure.

By putting all the applications on one grid, the user interface becomes a long list of applications that requires scrolling or navigating to find the particular function the user wants to use. These are two-dimensional implementations as the present state of the art menu structures, wherein a user can navigate either horizontally and/or vertically. If a display size is small, like in portable terminal devices such as mobile terminals, a user may need to navigate a long time through the menu before the function is found. On the other hand, typically menu structures are fixed so that particular functions can always be found from a particular part of the menu structure. This is disadvantageous if the user has to navigate through many menus and sub-menus in order to find what he is looking for only because the first menus only provide less/rarely used functions for the user.

With small displays, the menu items are either in a long list, or in a grid, i.e. only two dimensions of the interaction are utilized. In soft keys, there is usually a menu (i.e. options) that the user pulls down. With soft keys there is very limited amount of options available at one moment and therefore lists are used to offer options. This leads often to losing sight of the actual content.

SUMMARY OF THE INVENTION

The present invention concerns a method for providing functions to be performed in an electronic device, for using of the device. The invention concerns a menu structure that takes advantage of a third dimension wherein the menu comprises several partially overlapped menu layers on a display of the device. Current state of the art methods require many button presses and there are some applications, services or documents that are used more than others. To overcome these issues the method according to the present invention provides a quick way to use the functions (applications, services, etc.) in the device by hiding the less used functions to layers behind the layers comprising the more frequently used functions. The user is capable of organizing the functions in the layers so that frequently used functions are located on the top most layers and are therefore more easily and faster accessible for the user.

This invention eases navigation in menus when using a joystick, a rocker switch controller, a keyboard, voice commands or when using a touch sensitive display as an interaction device. A movement of a joystick or a switch of a rocker switch controller or a key of a keyboard preferably corresponds to a location of a menu function from the center of the menu layer. Also a voice command or a touch of a touch sensitive display preferably corresponds to that function to be selected by the user. It is possible to decrease the amount of clicks to the most common actions when the topmost layers are more easily accessible.

This invention utilizes a third dimension, i.e. depth in arranging actions to layers that are easily accessible. Also when using this method, it is possible for a user to remember more easily where certain actions or objects are located. Another advantage is that the amount of information for the user is much more limited than in the earlier solutions. The user sees only the most important things, but the others are also very easily accessible.

By using the third dimension (even though the visual presentation may be two dimensional) it is possible to add information in layers that provide more information when required. In a way, this is then "mental 3D" where the user perceives the user interface as three-dimensional when the objects behind the topmost are also partially visible.

According to a first aspect of the invention a method is provided for using menu functions of an electronic device. The method is characterized in that it comprises: providing on a display of the electronic device said menu functions in a menu structure comprising at least a first menu layer comprising first menu functions, the first menu layer being on the front on the display and at least one further menu layer comprising second menu functions and being at least partially covered by said first menu layer, the method further comprising at least one of the following steps: the user selecting one of said at least one further menu layer to be moved to the front on the display instead of said first menu layer by giving a first command, said first menu layer thus being at least partially covered by said selected one of said at least one further menu layer, and the user selecting a menu function presented on that menu layer, which is on the front on the display by giving a second command.

According to a second aspect of the invention an electronic device is provided for using menu functions, said electronic device comprising a display for displaying information to the user. The electronic device is characterized in that it comprises a display for displaying information to a user of the electronic device and a processor that is adapted:

to make the display to show a menu structure comprising at least a first menu layer comprising first menu functions, the first menu layer being on front on the display, and at least one further menu layer comprising second menu functions and being at least partially covered by said first menu layer, as a response to a first command given by the user to move one of said at least one further menu layer to the front on the display instead of said first menu layer, said first menu layer thus being at least partially covered by said one of said at least one further menu layer, and as response to a second command given by the user to control operation of a menu function belonging to that menu layer, which is on the front on the display.

According to a third aspect of the invention a computer program product embodied in a computer readable medium is provided for using menu functions of an electronic devices, the electronic device comprising a display. The computer program product is characterized in that it comprises: computer program means for providing on the display said menu functions in a menu structure comprising at least a first menu layer comprising first menu functions, the first menu layer being on the front on the display and at least one further menu layer comprising second menu functions and being at least partially covered by said first menu layer, computer program means for causing the electronic device to control one of said at least one further menu layer to be moved to the front on the display instead of said first menu layer in response to a first command given by the user, said first menu layer thus being at least partially covered by said selected one of said at least one further menu layer, and computer program means for causing the electronic device to control a function of a menu function presented on that menu layer, which is on the front on the display in response to a second command given by the user.

This invention enables seeing more of the content and the options at the same time. Navigating through a menu structure is more intuitive and easier than in state of the art methods. The top menu layer of the menu structure is covering all of the lower menu layers at least partially and can be made to cover almost the entire display. The lowest layers might not be visible at all and the layers closest to the top menu layer might be covered almost completely by the top menu layer, so that the characters and/or icons presented in the top menu layer can be made as big as possible in order to be more easy to read especially on a small display screen. The interaction method of the invention is suitable for e.g. to menu browsing, menu selection or text input. Further, it can replace the soft keys and option-menus in electronic devices such as mobile terminals. Preferably the method of the invention is suitable for use in devices that provide visual information on relatively small displays.

In the following, the invention will be described in greater detail with reference to the accompanying drawings, in which FIG. 1 illustrates a flow diagram of a method according to an embodiment of the invention;

FIG. 3b illustrates an electronic device according to an embodiment of the invention illustrated in FIG. 3a;

FIG. 3c illustrates an alternative electronic device according to an embodiment of the invention illustrated in FIG. 3a.

Figure 1:
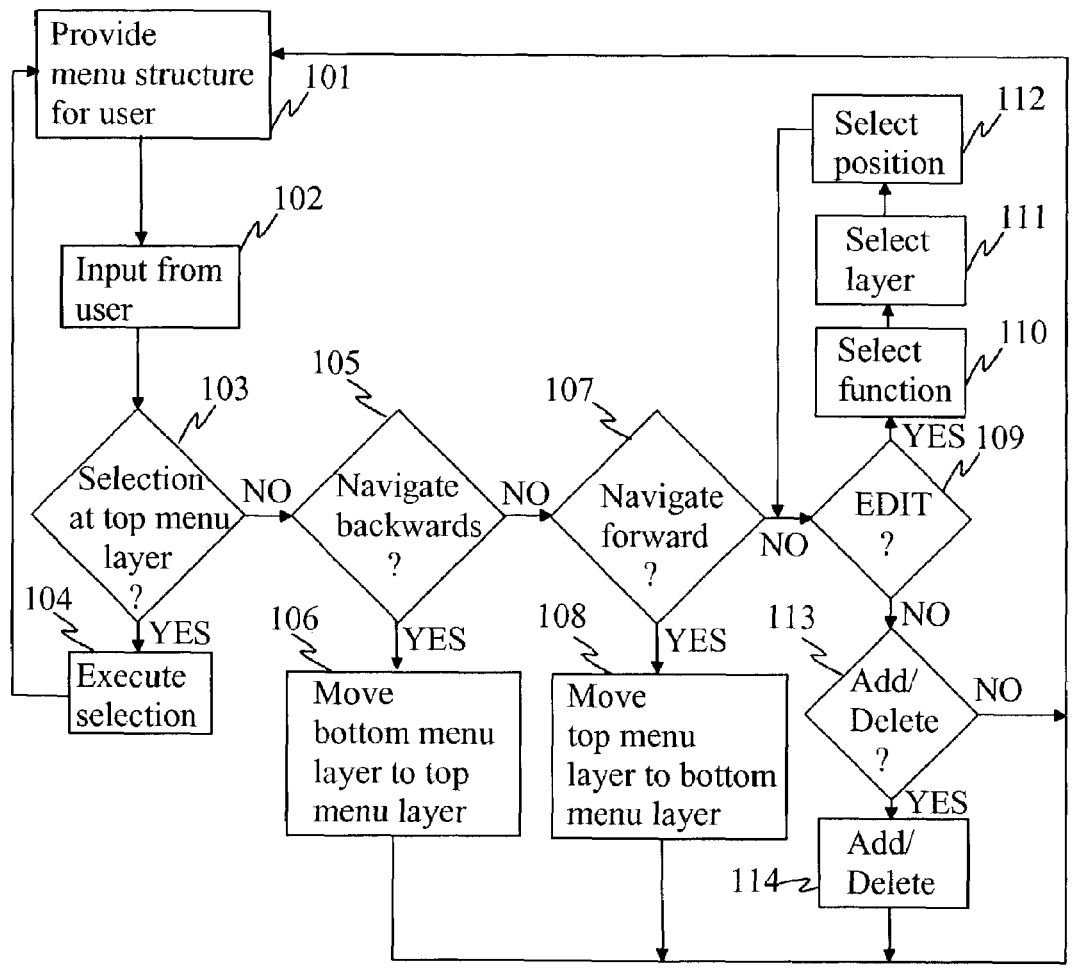
Figure 2A:
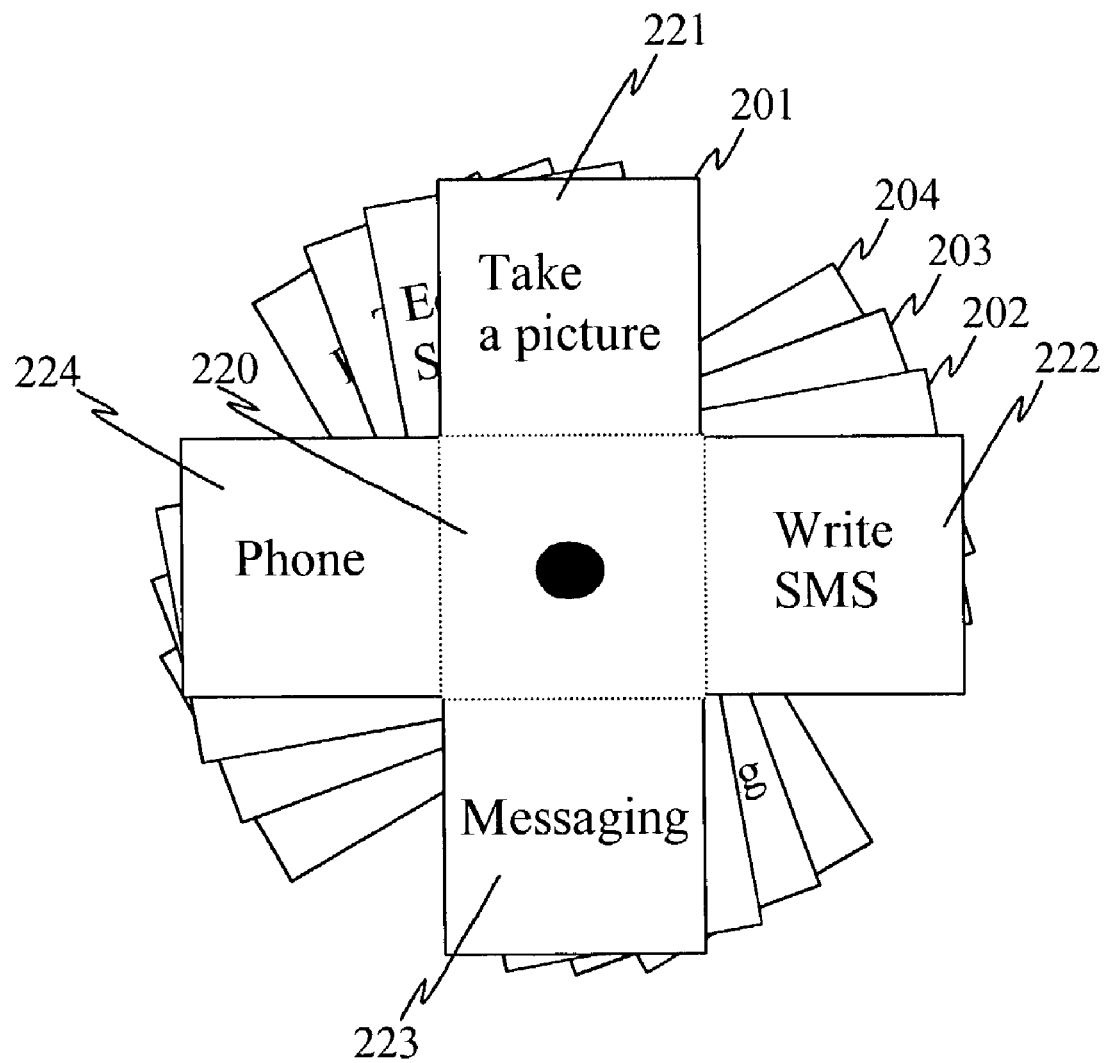
FIG. 2a illustrates visual arrangement of a menu structure of a user interface according to an embodiment of the invention.

FIG. 1 illustrates a flow diagram of a method according to an embodiment of the invention. The steps of the method may be preferably implemented as a computer program code stored into a memory of an electronic device. In step 101 a user interface application provides a menu structure, as illustrated in FIG. 2a for a user on a display of an electronic device. This step is preferably performed e.g. every time the device is started up or when an application e.g. a game or other application is terminated.

FIG. 2a illustrates visual arrangement of a menu structure of a user interface according to an embodiment of the invention. The menu structure comprises a top menu layer 201 and a plurality of menu layers 202-204 that are partially overlapped by said top menu layer. Each of the menu layers comprises 5 quadratic areas as illustrated relating to the menu layer 201. A function symbol is located on each of the areas 221-224. "Take a picture" on a forward area 221, "Write SMS" on a right area 222, "Messaging" on a back area 223 and "Phone" on a left area 224. A middle area 220 comprises preferably a function symbol for moving to the next and/or previous menu layer. In this exemplary illustration for case of simplicity the total amount of the layers is restricted to 4. The total amount can also be greater or smaller than 4. This arrangement is suitable for use with a controller device having at least four navigating buttons (e.g. a rocker switch controller having a shape of the menu layer 201) or directions (a joystick comprising a forward direction corresponding to the area 221, a right direction corresponding to the area 222, a back direction corresponding to the area 223 and a left direction corresponding to the area 224). A joystick direction or a button relating to the area 220 (for navigating through menu layers) can be implemented e.g. in the middle of the rocker switch controller as a fifth rocker switch or in the joystick as an ability to move the stick in the direction of the vertical axis when the stick is in the middle position. Alternatively the buttons/directions relating to the area 220 can be provided as one or more separate buttons. The user interface is provided on a display of an electronic device, such as e.g. a portable terminal device like a GSM and/or GPRS phone. The electronic device can also be for example a portable or a desktop computer or a game console.

Figure 2B:
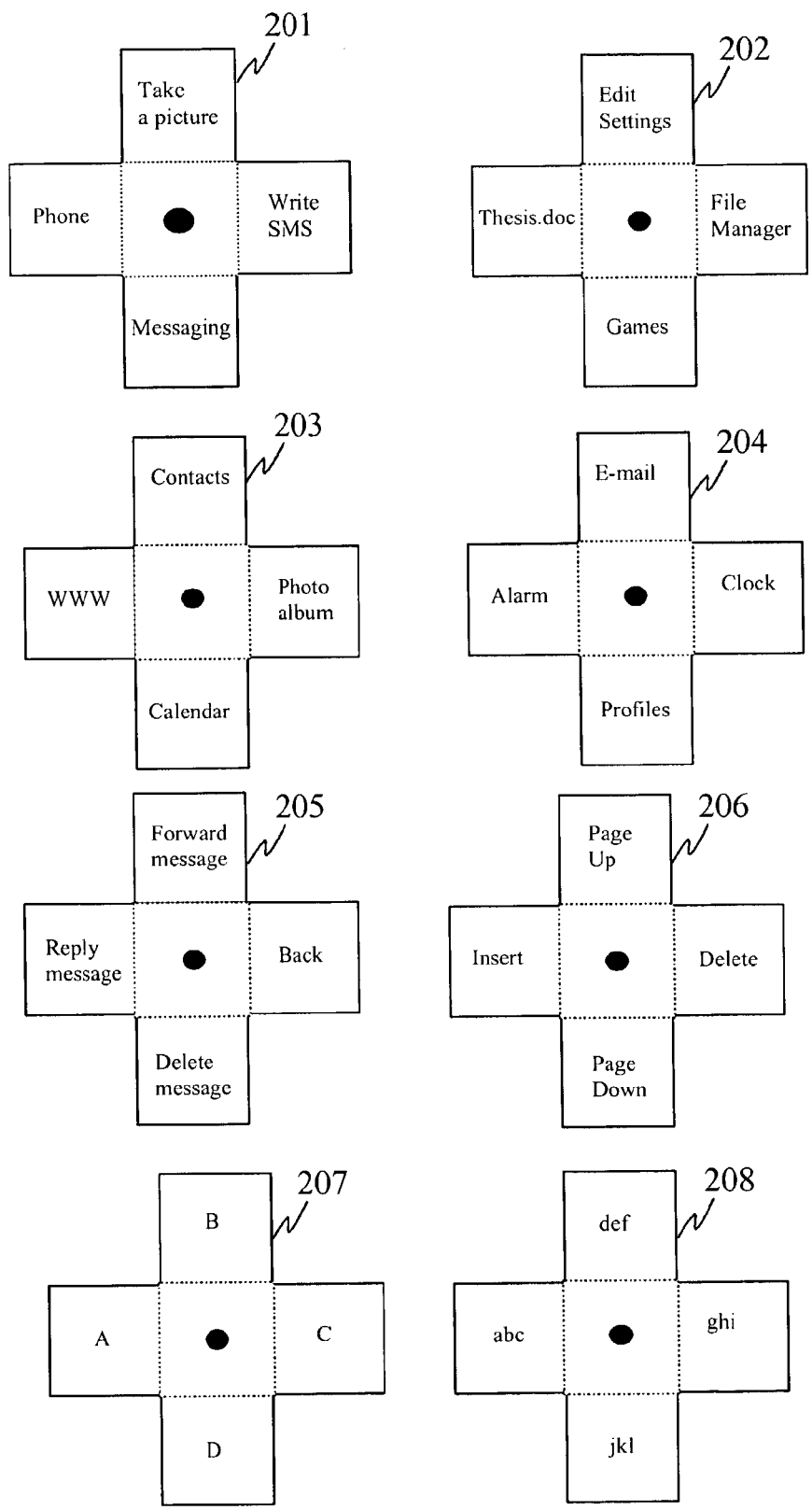
FIG. 2b illustrates possible layouts of menu layers of a user interface according to an embodiment of the invention.

FIG. 2b illustrates possible layouts of menu layers of a user interface according to an embodiment of the invention. The menu structure of the present invention can provide a submenu for a selected function symbol. Such a submenu layer is illustrated in reference numeral 205, which is a sub menu layer for function symbol "messaging" 223 comprising sub functions relating to messaging, such as forwarding ("Forward message"), replying ("Reply") or deleting a message ("Delete"), or moving back to the previous menu layer (that is in this case menu layer 201).

The menu structure comprises a top menu layer 201 that is preferably fully visible for the user and a plurality of lower menu layers 202-204 at least partially covered by said top menu layer 201. This leaves much space for the top menu layer where the text can thus be made as large as possible to ease reading, yet leaving a 3-D impression to the user by showing at least parts of at least some lower layer menus.

Preferably each of the menu layers 201-204 comprises one or more function symbols comprising a visual symbol (e.g. an icon) and/or a short text relating to the function in question. It is advantageous for the user of the device that the order of the menu layers is always the same when the menu layers are to be provided for the user in the situations described above in connection with step 101. This helps the user to remember the content of the layers more easily. The user interface application device awaits input from the user at step 102.

The user is able to give an input by using a controller device, such as a rocker switch controller or a joystick having several optional directions to be moved. Alternatively the user is able to give the input by using voice commands or by using a touch sensitive display of the device or other known input means. If the user makes a selection at the top menu layer (step 103) the device executes a task relating to that selection (step 104), i.e. by selecting one of the functions on located on the areas 221-224. The computer program in the device preferably keeps a log of frequency of the selections the user makes. This is preferable especially when using an option to make the menu items in the menu layers adaptive in the sense that the function symbols take their places on the layers on the basis of the frequency of the use. More frequently used function symbols are located and presented in the top most layers and respectively less frequently used function symbols are located and presented on the lower layers.

The user may alternatively give input to the device in order to get to the next menu layer (menu layer 202) or previous menu layer (menu layer 204). If the user wants to navigate backwards to the previous menu layer (step 105) the device provides the lowest or bottom menu layer (layer 204) of the menu structure as a new top menu layer (step 106) and respectively the previous top menu layer now becomes the next menu layer behind the top menu layer and so on. The order of the menu layers from bottom menu layer to top menu layer is now layer 203, layer 202, layer 201 and layer 204. Alternatively, if the user wants to navigate to the next menu layer (layer 202) (step 107), the application provides the menu layer (layer 202) of the menu structure as a new top menu layer (step 108) and respectively the previous top menu layer now becomes the lowest menu layer. The order of the menu layers from bottom to top is now: layer 201, layer 204, layer 203 and layer 202. Thus the user can scroll between the layers in forward or backward direction.

The user is able to edit the menu structure by changing manually the position of the functions to be provided in the menu layers. When the user decides to edit the menu structure (step 109), for example by selecting a function symbol comprising the text "edit settings" at menu layer 202 (see FIG. 2b), the application first asks the user to select a feature symbol to be edited. At this stage the user is able to edit the name and/or the symbol of the selected feature. It is also possible for the user to add or delete menu layers in the menu structure (steps 113 and 114). When the symbol is selected, the application asks the user to select a menu layer to which the user wants to move the selected feature symbol. The user preferably navigates (step 111) to the menu layer and selects a position (step 112) whereto the function symbol is to be moved. For example if the user wants to move "Take a picture" symbol from layer 201 to layer 203 to position where the symbol "Contacts" is located and respectively to move the symbol "Contacts" to the menu layer 201 to the position of "Take a picture" symbol, the user selects "switch" option in the edit mode. When the switch option is selected the user first selects a first item ("Take a picture") and then a second item ("Contacts"). When the second item is selected the application automatically switches places of said items.

If the user wants to move more than two items to different layers or different locations, the user selects "move" option in the edit mode. Now it is preferably to move more than two items at the same time. When a first item is selected and moved by the user to a position where already a second item is located, said second item becomes active after the first item is moved to the location of said second item. Now it is easy and fast to move said second item to another position that may be e.g. an empty location.

The menu structure of the present invention can also be used to replace keyboard buttons/keys. In this case the method is preferably used with a joystick or a rocker switch controller. Menu layer 206 comprises functions typical for example on a keyboard of a laptop or desktop computer. The menu layer comprises functions such as "Page Up", "Page Down", "Insert" and "Delete". The operational meaning of such functions is known from the state of the art. Other buttons and/or functions can also be replaced by the method of the invention.

In the text input variation the user inputs a character at a time, and after each character the method returns to the beginning (or to the most likely character or word depending whether there is some sort of predictive input). A menu layer for character input is illustrated as an example in the menu layer 207. There needs to be at least 9 menu layers to be browsed before all letters in the alphabet are accessible (this does not count the special characters). With predictive input and/or with the menu layer structure 208 a faster character input can be achieved. Further when using the menu layer structure illustrated in menu layer 208, less menu layers is needed for providing all letters in alphabet. Character input can be performed the same way as it is performed in present mobile terminals. Pressing "abc" button once character "a" is inputted, pressing the button twice, "b" is inputted, etc, or using the adaptive text input to access any of "a" and "b" and "c" with a single press of the "abc" button as known from e.g. the Nokia 3300 series phone.

Figure 2C:
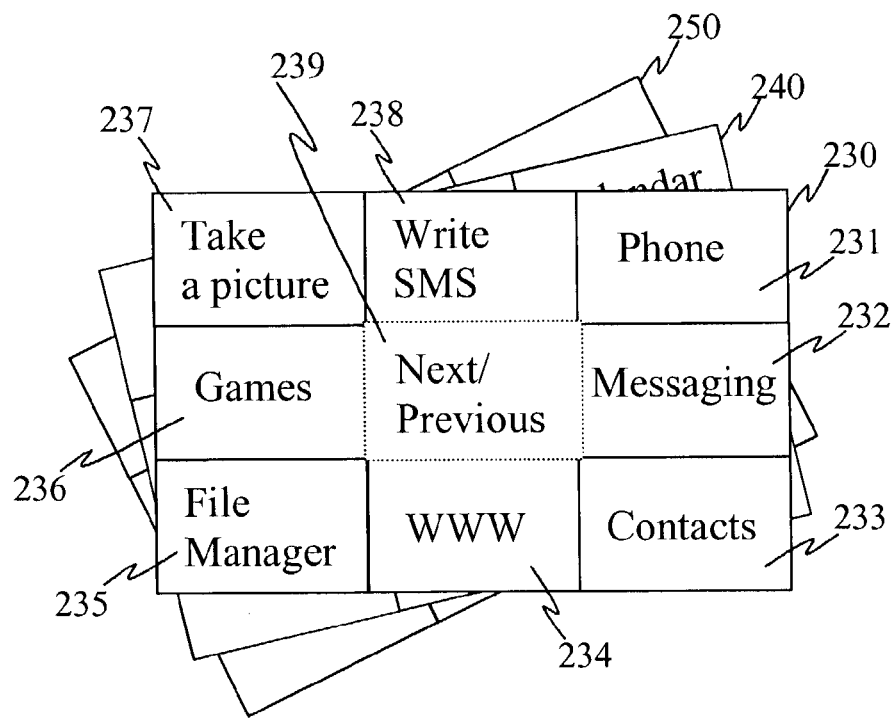
FIG. 2c illustrates visual arrangement of a menu structure of a user interface according to an alternative embodiment of the invention.
Figure 2D:
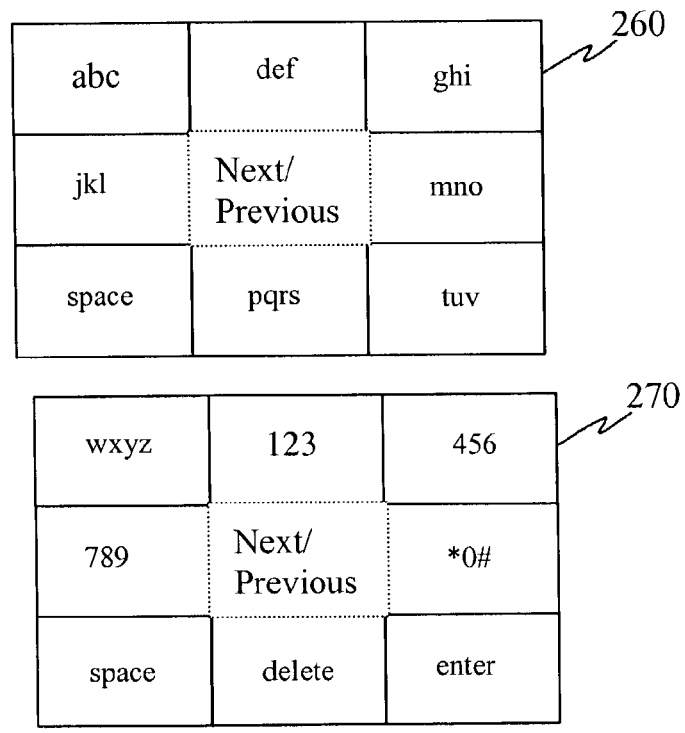
FIG. 2d illustrates possible layouts of menu layers of a user interface according to an alternative embodiment of the invention in FIG. 2c.

FIG. 2c illustrates visual arrangement of a menu structure of a user interface according to an alternative embodiment of the invention. It is also possible to add more directions to the system illustrated in FIGS. 2a and 2b. The arrangement described herein is suitable for use with a controller device (such as a rocker or a joystick) comprising 8 directions: up (reference 238), up right (reference 231), right (reference 232), down right (reference 233), down (reference 234), down left (reference 235), left (reference 236) and up left direction (reference 237). FIG. 2d illustrates possible layouts of menu layers of a user interface according to an alternative embodiment of the invention in FIG. 2c. FIG. 2d illustrates a suitable method for providing all letters in the alphabet and numerals from 0-9 and other characters and functions in only two menu layers. The menu structure according to FIGS. 2c and 2d is suitable for a controller, such as a rocker switch controller or a joystick comprising 8 directions (up, up-right, right, down-right, down-left, left and up-left). Moving to next/previous layer is preferably done by a $9^{th}$ rocker switch or joystick direction. This arrangement is also suitable for a touch sensitive display or for voice commands.

Figure 3A:
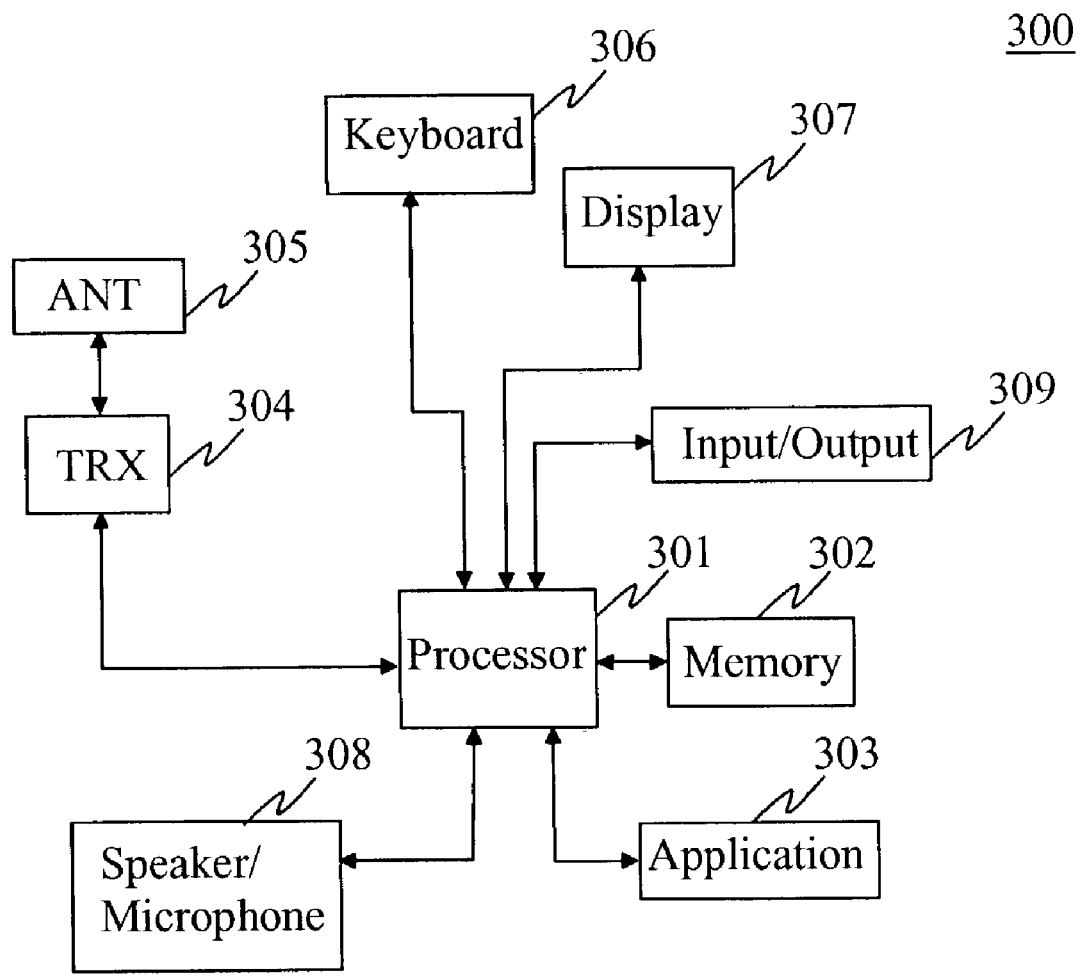
FIG. 3a illustrates a block diagram of an electronic device 300 according to an embodiment of the invention.

FIG. 3a illustrates a block diagram of an electronic device 300 according to an embodiment of the invention. The device 300 is preferably a wireless terminal device operating in a communications system such as e.g. a GSM, GPRS, UMTS or Bluetooth. The communications system to be used in the device 300 can be also other than one of the previously mentioned. The device can alternatively be a portable lap top computer, a desktop computer, a gaming device, like a portable game consol, or a Personal Digital Assistant (PDA). The device 300 comprises a processor 301 and a memory 302 for operating tasks of the device 300 and for running applications stored into the device. The memory is preferably e.g. a random access memory (RAM) and/or read only memory (ROM). The device preferably comprises applications 303 such as the user interface according to the present invention. Also the device can comprise other applications.

For operating in a communications system mentioned previously, the device further comprises a transceiver 304 and an antenna 305 for transmitting and receiving information wirelessly. For data input the device further comprises a keyboard 306, which can be e.g. a soft key keyboard or a touch sensitive area on a surface of the device providing visual symbols for the user to select by touching said symbol. The device preferably further comprises other input means, such as a joystick, a rocker switch controller, and a touch sensitive display or voice command ability. The device further may comprise a cable connection and/or infrared connection 309 for inputting data from and outputting data to other devices. For data output the device 300 preferably comprises a display 307 that can be a monochrome or color display such as a LCD display or other suitable display, like a touch sensitive display. The device further comprises a speaker and/or a microphone 308 for enabling the user to provide and receive audio information.

Figure 3B:
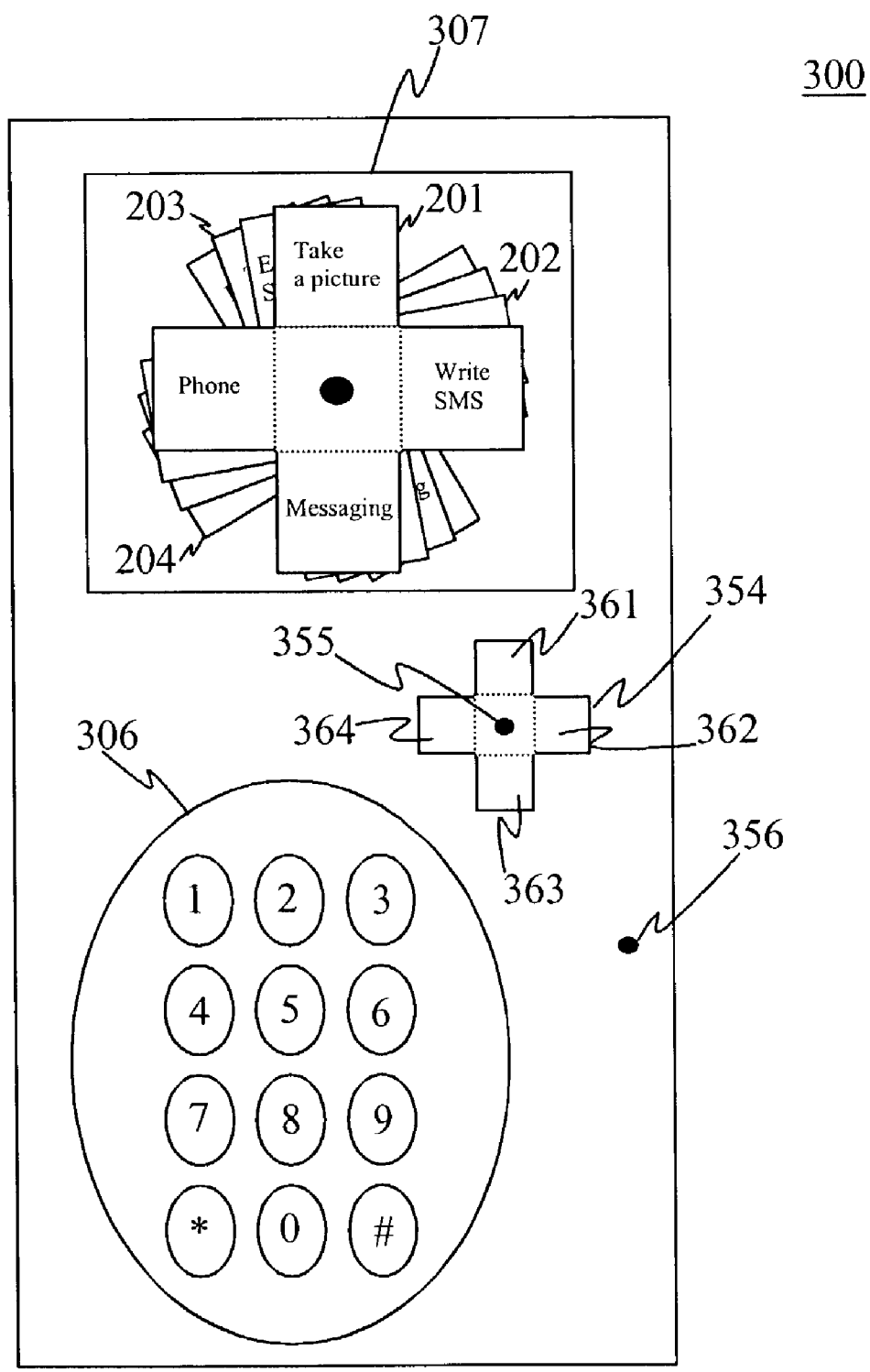

FIG. 3b illustrates an electronic device according to an embodiment of the invention illustrated in FIG. 3a. In FIG. 3b, a device 300 comprises a rocker switch controller 354 preferably having a visual shape of the menu layer of the present invention. The controller 354 comprises at least four rocker switches (not shown on the picture) covered by the controller 354 (corresponding to areas 361364). The controller comprises quadratic areas 361-364 each corresponding a quadratic area (221-224) of a menu layer presented on FIG. 2a. The controller further comprises a quadratic area 355 in the middle of said controller. The four buttons 361-364 are used for selecting a function on a top menu layer. Also another button 356 is illustrated. The buttons 355 and 356 are used for selecting a menu layer to be presented as the top menu layer.

Figure 3C:
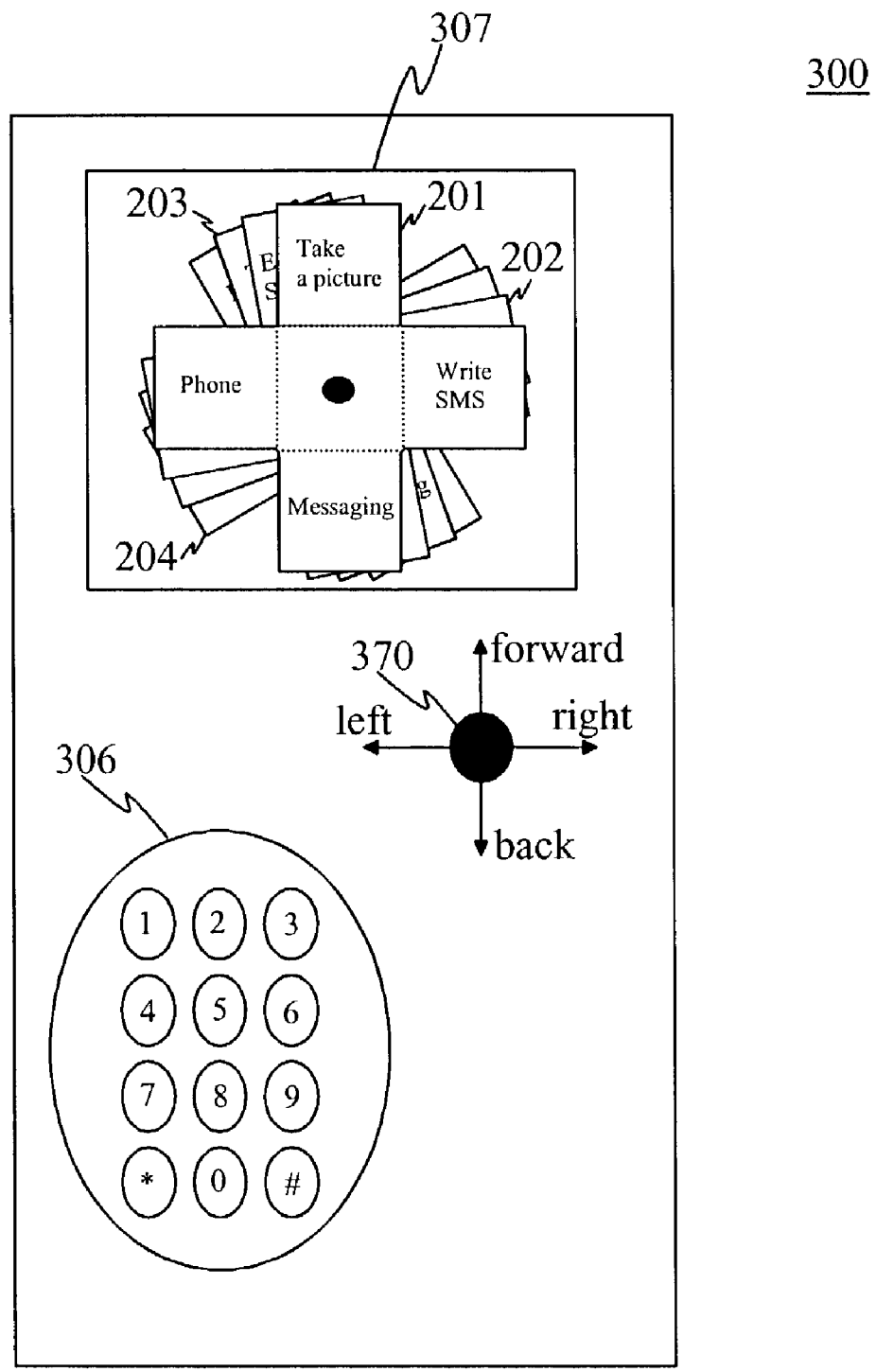

FIG. 3c illustrates an alternative electronic device according to an embodiment of the invention illustrated in FIG. 3a. In FIG. 3c, a device 300 comprises a joystick controller 370 that comprises four directions (forward, right, back and left) each corresponding a quadratic area 221-224 of a menu layer on FIG. 2a. Forward direction is corresponding area the 221, left direction is corresponding the area 222, back direction the area 223 and left direction the area 224.

Now referring to FIG. 3b, an example of the visual outlook of the electronic device 300 is illustrated. A computer program application, like a user interface application is arranged to provide a user interface according to the invention on the display 307 of the device 300. A menu structure, e.g. such as described in FIG. 2a, comprising a top menu layer 201 and a plurality of menu layers 202-204 partially overlapped by said top menu layer is provided to the user.

If the user wants to use the functions provided in the menu structure, e.g. take a picture with a camera of the device (not shown on the picture), the user selects function "take a picture" by moving a controller device to the appropriate direction, e.g. by moving a joystick controller to a "up" direction or by pressing the appropriate switch (e.g. switch 361, if it is assumed to correspond "Take a picture" function) of the rocker switch controller 354. The user interface application launches a camera application and the user is now capable to take a picture. When the user terminates the camera application, the user interface application provides the menu structure on the display of the device 300.

If the user wants to navigate to the next menu layer (the layer next behind the top menu layer) or previous menu layer (the layer that is a bottom menu layer), this can be done e.g. by pressing the appropriate button (e.g. the button 355). Let us assume that the user first navigates to menu layer 203 for checking his/hers calendar. The user simply presses the button 355 twice to move to that layer and then presses appropriate rocker switch 363 to launching a calendar application in the device.

After checking the calendar, the user now wants to make a phone call. There are two alternative ways to navigate to menu layer 201. The order of the menu layers from bottom to top is 202, 201, 204, 203 i.e. the menu layer 203 is the top menu layer and the menu layer 202 is the bottom menu layer (the lowest menu layer). The user may navigate forward by pressing the button 354 twice as described before, or by pressing appropriate button twice for example the button 365 to go backwards to the layer 350. The backward navigation can be alternatively implemented by holding the button 355 down for a predetermined time that is longer than when navigating forward by pressing the same button. For example, if the button 354 is held down a predetermined time interval that is less than 0.5 second the user interface application navigates forward to the next menu layer behind the top menu layer. If the button 354 is held down more than said exemplary 0.5 second, the user interface application navigates backward and provides the bottom menu layer as a top menu layer.

The present invention is not to be restricted to the preferred embodiments described above. With visualizations and animations it is possible to make this method of interaction far more intuitive, i.e. the layers should fall towards the user, or otherwise it should be implicated that the layer moves to the back of the pack. It is also possible to increase the impression by spiral-like rotation that makes it more evident that the layers on top take their place as the central ones. Further, colors may be used in highlighting the different layers to add users possibilities to remember where certain actions can be found.

The above disclosure illustrates the implementation of the invention and its embodiments by means of examples. A person skilled in the art will find it apparent that the invention is not restricted to the details of the above-described embodiments and that there are also other ways of implementing the invention without deviating from the characteristics of the invention. The above embodiments should thus be considered as illustrative and not restrictive. Hence the possibilities of implementing and using the invention are only restricted by the accompanying claims and therefore the different alternative implementations of the invention, including equivalent implementations, defined in the claims also belong to the scope of the invention.

The invention claimed is:

1. A method comprising:
   providing on a display of an electronic device menu functions in a layered menu structure comprising several at least partially overlapped menu layers, the layered menu structure comprising at least a first menu layer and at least one further menu layer, said first menu layer comprising first menu functions, the first menu layer being displayed as a top layer of the layered menu structure on the display, said at least one further menu layer comprising second menu functions, in which layered menu structure the at least one further menu layer and other menu layers preceding the at least one further menu layer are displayed as part of the layered menu structure so as to be at least partially covered by said first menu layer, where all menu layers except for the first menu layer are displayed as part of the layered menu structure so as to be at least partially covered by the first menu layer, the method further comprising:
forming a logical link between said first menu layer and one of said at least one further menu layer in such a way that said one of said at least one further menu layer is either (i) a menu layer that follows said first menu layer in the layered menu structure or (ii) a menu layer that precedes said first menu layer in the layered menu structure,
a user selecting said one of said at least one further menu layer to be moved to the top layer of the layered menu structure so as to be displayed on the display instead of said first menu layer by giving a first command, said first menu layer then being displayed as part of the layered menu structure so as to be at least partially covered by said selected one of said at least one further menu layer, and
the user selecting a menu function presented on that menu layer which is on the top layer of the layered menu structure displayed on the display by giving a second command.

2. The method according to claim 1, wherein the menu layer that is on the top layer of the layered menu structure is completely visible on the display.

3. The method according to claim 2, wherein the layered menu structure further comprises at least one menu layer between said first menu layer and said at least one further menu layer.

4. The method according to claim 3, wherein said at least one menu layer between said first and said at least one further menu layer is at least partially covered by the first menu layer.

5. The method according to claim 4, wherein said first command causes the electronic device to scroll forward the layered menu structure by moving the next menu layer behind said first menu layer to the front on the display and by moving the first menu layer to the lowest at least partially covered menu layer of the layered menu structure.

6. The method according to claim 4, wherein said first command causes the electronic device to scroll backwards the layered menu structure by moving the lowest menu layer of the at least partially covered menu layers of the layered menu structure to the front on the display and by moving the first menu layer to the next menu layer behind the menu layer on the front on the display.

7. The method according to claim 6, wherein said first command is one of the following: a voice command, a touch of a key of a keyboard of the electronic device or a movement of a controller device of the electronic device.

8. The method according to claim 1, wherein said second command causes the electronic device to execute the selected function.

9. The method according to claim 8, wherein said second command is one of the following: a voice command or a touch of a touch sensitive area on a surface of the electronic device, and corresponds to a function on the selected menu layer.

10. The method according to claim 7, wherein said second command is a touch of a touch sensitive area on a surface of the electronic device, said touch corresponding to a location of a function on the menu layer.

11. The method according to claim 7, wherein said second command is a movement of a controller device to a direction corresponding to a direction of a function on the menu layer from a center of the menu layer.

12. The method according to claim 1, the method further comprising editing said layered menu structure by moving a symbol representing a particular menu function from a location on one of said menu layers to a location on another one of said menu layers.

13. The method according to claim 12, wherein said editing is executed manually by the user.

14. The method according to claim 12, wherein said editing is executed automatically by the electronic device on the basis of a usage frequency of said menu function.

15. An electronic device comprising:
a display for displaying information to a user of the electronic device, and
a processor,
wherein said processor is adapted:
to show a layered menu structure comprising several menu layers on the display, said layered menu structure comprising at least a first menu layer and at least one further menu layer, said first menu layer comprising first menu functions, the first menu layer being displayed as the top layer of the layered menu structure on the display, said at least one further menu layer comprising second menu functions, in which layered menu structure the at least one further menu layer and other menu layers preceding the at least one further menu layer are displayed as part of the layered menu structure so as to be at least partially covered by said first menu layer, where all menu layers except for the first menu layer are displayed as part of the layered menu structure so as to be at least partially covered by the first menu layer,
to form a logical link between said first menu layer and one of said at least one further menu layer in such a way that said one of said at least one further menu layer is either (i) a menu layer that follows said first menu layer in the layered menu structure or (ii) a menu layer that precedes said first menu layer in the layered menu structure,
as a response to a first command given by a user, to move said one of said at least one further menu layer to the top layer of the layered menu structure so as to be displayed on the display instead of said first menu layer, said first menu layer thus being displayed as part of the layered menu structure so as to be at least partially covered by said one of said at least one further menu layer, and
as a response to a second command given by the user, to control operation of a menu function belonging to that menu layer which is on the top layer of the layered menu structure displayed on the display.

16. The electronic device according to claim 15, wherein said layered menu structure is arranged to provide the menu layer, located on the top layer of the layered menu structure as completely visible on the display.

17. The electronic device according to claim 15, wherein said layered menu structure is further arranged to provide at least one menu layer between said first menu layer and said at least one further menu layer.

18. The electronic device according to claim 17, wherein said layered menu structure is arranged to provide at least one of said at least one menu layer between said first menu layer and said at least one further menu layer at least partially covered by the first menu layer.

19. The electronic device according to claim 15, wherein said first command causes the processor to scroll forward the layered menu structure by moving the next menu layer behind said first menu layer to the front on the display and by moving the first menu layer to the last at least partially covered menu layer of the layered menu structure.

20. The electronic device according to claim 15, wherein said first command causes the processor to scroll backwards the layered menu structure by moving the last menu layer of the at least partially covered menu layers of the layered menu structure to the front on the display and by moving the first menu layer to the next menu layer behind the menu layer on the front on the display.

21. The electronic device according to claim 15, wherein said second command causes the electronic device to execute a selected function.

22. The electronic device according to claim 19, wherein said electronic device further comprises a joystick controller and said first command and said second command is a movement of the joystick controller to a direction corresponding to a selected function.

23. The electronic device according to claim 19, wherein said electronic device further comprises a touch sensitive display and said first command and said second command is a touch of the touch sensitive display at a location corresponding to a selected function.

24. The electronic device according to claim 19, wherein said electronic device further comprises a rocker switch controller device and said first command and said second command is a touch of an area of the rocker switch controller device corresponding to a selected function.

25. The electronic device according to claim 15, wherein the processor is further adapted to perform editing said layered menu structure by moving a function symbol representing a particular menu function from a location on one of said menu layers to a location on another one of said menu layers.

26. The electronic device according to claim 25, wherein said function symbol is selected by the user.

27. The electronic device according to claim 25, wherein said function symbol is automatically selected by the electronic device.

28. A memory encoded with a computer program, execution of the computer program resulting in operations comprising:
providing on a display of an electronic device a layered menu structure comprising several at least partially overlapped menu layers, the layered menu structure comprising at least a first menu layer and at least one further menu layer, said first menu layer comprising first menu functions, the first menu layer being displayed as the top layer of the layered menu structure on the display, said at least one further menu layer comprising second menu functions, in which layered menu structure the at least one further menu layer and other menu layers preceding the at least one further menu layer are displayed as part of the layered menu structure so as to be at least partially covered by said first menu layer, where all menu layers except for the first menu layer are displayed as part of the layered menu structure so as to be at least partially covered by the first menu layer,
forming a logical link between said first menu layer and one of said at least one further menu layer in such a way that said one of said at least one further menu layer is either (i) a menu layer that follows said first menu layer in the layered menu structure or (ii) a menu layer that precedes said first menu layer in the layered menu structure,
controlling said one of said at least one further menu layer to be moved to the top layer of the layered menu structure so as to be displayed on the display instead of said first menu layer in response to a first command given by a user, said first menu layer thus being displayed as part of the layered menu structure so as to be at least partially covered by said one of said at least one further menu layer, and
controlling a function of a menu function presented on that menu layer, which is on the top layer of the layered menu structure displayed on the display, in response to a second command given by the user.

29. The memory according to claim 28, the operations further comprising: making the menu layer that is on the top layer of the layered menu structure completely visible on the display.

30. The memory according to claim 29, wherein the layered menu structure further comprises at least one menu layer between said first menu layer and said at least one further menu layer.

31. The memory according to claim 30, the operations further comprising: making said at least one menu layer between said first and said at least one further menu layer to be at least partially covered by the first menu layer.

32. The memory according to claim 31, the operations further comprising: in response to the first command, scrolling the layered menu structure forward by moving the next menu layer behind said first menu layer to the front on the display and moving the first menu layer to the lowest at least partially covered menu layer of the layered menu structure.

33. The memory according to claim 31, the operations further comprising: in response to the first command, scrolling the layered menu structure backwards by moving the lowest menu layer of the at least partially covered menu layers of the layered menu structure to the front on the display and moving the first menu layer to the next menu layer behind the menu layer on the front on the display.

34. The memory according to claim 33, wherein said first command is one of the following: a voice command, a touch of a key of a keyboard of the electronic device or a movement of a controller device of the electronic device.

35. The memory according to claim 34, wherein said second command is a touch of a touch sensitive area on a surface of the electronic device, said touch corresponding to a location of a function on the menu layer.

36. The memory according to claim 34, wherein said second command is a movement of a controller device to a direction corresponding to a direction of a function on the menu layer from a center of the menu layer.

37. The memory according to claim 28, the operations further comprising: in response to the second command, executing the function.

38. The memory according to claim 37, wherein said second command is one of the following: a voice command or a touch of a touch sensitive area on a surface of the electronic device, and corresponds to a function on the selected menu layer.

39. The memory according to claim 28, the operations further comprising: editing said layered menu structure by moving a symbol representing a particular menu function from a location on one of said menu layers to a location on another one of said menu layers.

40. The memory according to claim 39, the operations further comprising: enabling the user to execute said editing manually.

41. The memory according to claim 39, the operations further comprising: executing said editing automatically on a basis of a usage frequency of said particular menu function.

42. The electronic device according to claim 1, wherein the electronic device is a terminal of a cellular communications system.

43. The memory according to claim 28, wherein the electronic device is a terminal of a cellular communications system.

* * * * *